United States Patent [19]

Ito et al.

[11] 3,789,068
[45] Jan. 29, 1974

[54] AMINOETHANESULFONIC ACID DERIVATIVE

[75] Inventors: Shoichi Ito, Tokyo; Mikio Ninomiya, Kanagawa; Hidekuni Uchida, Saitama, all of Japan

[73] Assignee: Taisho Pharmaceutical Co., Ltd., Tokyo, Japan

[22] Filed: Dec. 7, 1970

[21] Appl. No.: 95,932

[30] Foreign Application Priority Data
Dec. 6, 1969 Japan.............................. 44-98059

[52] U.S. Cl. ............................. 260/507 R, 424/315
[51] Int. Cl. .......................................... C07c 143/54
[58] Field of Search ............................... 260/507 R

[56] References Cited
UNITED STATES PATENTS
2,193,944   3/1940   Steindorff et al. ............. 260/507 R OTHER PUBLICATIONS
Richter, Textbook of Organic Chemistry, Page 204 (1938).

Primary Examiner—Daniel D. Horwitz
Attorney, Agent, or Firm—Wenderoth, Lind & Ponack

[57] ABSTRACT 2-($\alpha$-(p-Chlorophenoxy)-isobutyryl)-aminoethanesulfonic acid and the salts thereof, which possess valuable pharmacological and therapeutic properties, and the pharmaceutical compositions containing the same.

2 Claims, No Drawings

3,789,068

AMINOETHANESULFONIC ACID DERIVATIVE

This invention relates to a novel aminoethanesulfonic acid derivative. More particularly, it concerns with 2-(α-(p-chlorophenoxy)-isobutyryl)-aminoethanesulfonic acid and the salts thereof, which possess valuable therapeutic properties, and the pharmaceutical compositions containing the same.

It has been known that ethyl α-(p-chlorophenoxy)-isobutyrate reduces the concentration of cholesterol in the blood serum and that, therefore, it is useful in the treatment of certain diseases such as coronary artery disease associated with an abnormally high concentration of cholesterol in the blood serum.

Although ethyl α-(p-chlorophenoxy)-isobutyrate is, indeed, excellent in its preferable cholesterol lowering effect and its low toxicity and has been put in practical use, this compound is bound up with some disadvantages. In some cases, it causes undesired side effects such as gastric disorders and diarrhea. Further, this ester is in the liquid state at the ambient temperature and consequently, has a disadvantage from the pharmaceutical point of view.

In order to obviate these disadvantages, we have prepared many derivatives and analogues of α-(p-chlorophenoxy)-isobutyric acid and screened their cholesterol lowering activities. In the course of this work, we have found that 2-(α-(p-chlorophenoxy)-isobutyryl)-aminoethanesulfonic acid, the compound of the present invention, has a cholesterol lowering effect approximately equal to or higher than that of ethyl α-(p-chlorophenoxy)-isobutyrate. Further, the compound of the present invention has extremely low toxicity and, even when administered for a prolonged term, shows no side effects as observed in the clinical use of ethyl α-(p-chlorophenoxy)-isobutyrate.

Moreover, we have also found that, beyond our expectation, the compound of the present invention possesses mild coronary dilating and anti-arrhythmic activites. Since an abnormally high concentration of cholesterol is often attended with coronary artery diseases, such accompanying activities are of great use and enhance the value of the present compound as a cholesterol lowering agent. From these accompanying activities which are not recognized in α-(p-chlorophenoxy)-isobutyric acid and the simple derivatives thereof such as the simple ester and amide, it may be concluded that the effect of the present compound does not derive from the degradation to isobutyric acid or its simple derivatives. That is, it may be drawn that the cholesterol lowering effect of the present compound is inherent in itself.

The preparation of 2-(α-(p-chlorophenoxy)-isobutyryl)-aminoethanesulfonic acid is carried out by coupling α-(p-chlorophenoxy)-isobutyric acid or a functional derivative thereof with 2-aminoethanesulfonic acid by usual method known in peptide or penicilline chemistry.

The term "functional derivative" of the said acid include α-(p-chlorophenoxy)-isobutyryl halide such as the chloride and bromide, α-(p-chlorophenoxy)-isobutyric anhydride such as the simple anhydride and mixed anhydride and α-(p-chlorophenoxy)-isobutyric ester such as a reactive ester e.g. p-nitrophenyl ester.

When the acid itself is used, the above coupling reaction is performed in the presence of a dehydrating agent such as a carbodiimide.

When a halide or anhydride is used, the above reaction is conducted under the presence of a base as a condensing agent. Suitable bases to be used are well known in the art and include alkali metal and alkaline-earth metal hydroxides and carbonates such as sodium, potassium and calcium hydroxides and carbonates and organic bases such as triethylamine. In this case, the reaction product is the salt of the desired acid and it may be converted, by treating with a suitable acid, into the free acid. The free acid may be further converted, when desired, into a physiologically compatible salt which is included in the scope of the invention.

In most preferred method, the present compound can be produced by reacting α-(p-chlorophenoxy)-isobutyric acid chloride or anhydride with 2-aminoethanesulfonic acid in the presence of sodium or potassium hydroxide or carbonate as a condensing agent and in water as a solvent. The reaction temperature is not critical, however, room temperature or below being preferable. Thus obtained reaction product is the salt of the base used as condensing agent, i.e., sodium or potassium salt of 2-(α-(p-chlorophenoxy)-isobutyryl)-aminoethanesulfonic acid. This salt is, of course, useful as hypocholesterolemic agent and included in the scope of the present invention. However, when desired, it may be converted into the free acid by treating with a sufficiently strong acid, preferably hydrochloric acid or sulfuric acid.

As stated above, also within the scope of the invention are the salts of 2-(α-(p-chlorophenoxy)-isobutyryl)-aminoethanesulfonic acid, which salts are prepared by the reaction of the free acid with a base having a nontoxic pharmacologically acceptable cation. In general, any base which will form a salt with a sulfonic acid and whose pharmacological properties will not cause an adverse physiological effect when ingested by the body system is considered as being within the scope of invention. Suitable bases for preparing the salts include the alkali metal and alkaline-earth hydroxides and carbonates, ammonia and amines such as choline, hydroxyethylamine and piperidine. The salts are functional equivalent of the free acid.

The compound in accordance with this invention has been tested and found to exhibit excellent hypochloesterolemic activity accompanying with mild coronary dilating and anti-arrhythmic activities. The compound may be administered alone or in combination with other chemotherapeutic agents in dosage unit form and in admixture with a pharmaceutical carrier for treatment of various syndroms associated with an abnormally high concentration of cholesterol, especially for treatment of coronary diseases and atherosclerosis.

Pharmaceutical compositions in accordance with the present invention comprise the compound of the present invention, optionally in combination with other compatible chemotherapeutic agent, toether with an inert nontoxic pharmaceutical diluent or carrier and are preferably in the form of a pill, tablet, capsule, power, granule, elixir, syrup or injectable solution prepared by a conventional method in the art.

The dosage of the present compound may be varied over a wide range as, for example, in the form of scored tablets containing 25, 50, 100, 125 and 250 miligrams of the active ingredient for the symptomatic adjustment of the dosage to the patient to be treated. These dosages are well below the toxic or lethal dosage of the present compound.

The following examples are illustrative of the preparation of the compound of the present invention. All temperatures are stated in degree Centigrade and all melting points are uncorrected. In these examples, "g" and "ml" signify gram and mililiter, respectively.

EXAMPLE 1

A solution of 12.5 g of 2-aminoethanesulfonic acid in 50 ml of water containing 9 g of sodium hydroxide is slowly added dropwise with 23.3 g of α-(p-chlorophenoxy)-isobutyryl chloride under stirring at 20°. After completion of the addition, stirring is continued for further 30 minutes and then the reaction mixture is cooled in ice bath. The precipitated product is filtered, dried and recrystallized from methanol to yield 26.1 g of sodium 2-(α-(p-chlorophenoxy)-isobutyryl)-aminoethanesulfonate, as colorless or white needles, melting at 198°–199°.

Analysis: Calculated for $C_{12}H_{15}ClNNaO_4S$, C 41.9, H4.37, N 4.08, Found, C 41.4, H 4.40, N 3.95.

EXAMPLE 2

A solution of 12.5 g of 2-aminoethanesulfonic acid in 50 ml of water containing 14 g of potassium hydroxide is slowly added dropwise with 23.3 g of α-(p-chlorophenoxy)-isobutyryl chloride under stirring at 20° or below. The resultant solution is concentrated to one third of its original volume under reduced pressure and allowed to stand overnight to precipitate the reaction product. Upon recrystallization of the precipitate from methanol, there are obtained 27.8 g of potassium 2-(α-(p-chlorophenoxy)-isobutyryl)-aminoethanesulfonate, as colorless or white needles or flakes, melting at 194°–195°.

EXAMPLE 3

Aminoethanesulfonic acid (12.5 g) is dissolved into a solution of 10 g of sodium hydroxide in 50 ml of water, and added dropwise with 50 g of α-(p-chlorophenoxy)-isobutyric anhydride at 10°–15° under stirring. After completion of the addition, stirring is continued at 20° until a homogeneous solution is obtained. Then the solution is made acidic with dilute hydrochloric acid, and the precipitated α-(p-chlorophenoxy)-isobutyric acid is removed by filtration. The resultant clear solution is allowed to stand overnight to produce white precipitate. Upon recrystallization of this precipitate from methanol, 23 g of sodium 2-(α-(p-chlorophenoxy)-isobutyryl)-aminoethanesulfonate are obtained as white needles melting at 196°–197°.

EXAMPLE 4

The procedure according to Example 1 is repeated except that 25.5 g of sodium carbonate and 100 ml of water are used in place of sodium hydroxide (9 g) and water (50 ml). The desired sodium salt (26 g) is obtained. Melting point: 198°.

EXAMPLE 5

Sodium 2-(α-(p-chlorophenoxy)-isobutyryl)-aminoethanesulfonate (20 g), obtained as in Example 1, is suspended in 90 ml of concentrated hydrochloric acid and heated at reflux temperature for 15 minutes. The insoluble material is filtered off and the filtrate is allowed to stand for several hours to produce the precipitate of white needles. Upon recrystallization of this precipitate, there are obtained 15.2 g of 2-(α-(p-chlorophenoxy)-isobutyryl)-aminoethanesulfonic acid as colorless needles or flakes melting at 124.5°.

By substituting potassium 2-(α-(p-chlorophenoxy)-isobutyryl)-aminoethanesulfonate produced as in Example 2 for the sodium salt of the above procedure, the same result is achieved.

EXAMPLE 6

The free acid can be converted to the desired salt, for example, as follws: 10 g of 2-(α-(p-chlorophenoxy)-isobutyryl)-aminoethanesulfonic acid is dissolved in saturated sodium chloride solution. The insoluble material, if any, is filtered off and then filtrate is allowed to stand under cooling for several hours to yield 9.5 g of sodium 2-(α-(p-chlorophenoxy)-isobutyryl)-aminoethanesulfonate.

EXAMPLE 7

To a vigorously stirred solution of 22 g of α-(p-chlorophenoxy)-isobutyric acid and 23 g of N,N'-dicyclohexylcarbodiimide in 200 ml of methylene chloride at 0° is dropwise added 13 g of 2-aminoethanesulfonic acid in 200 ml of water over a period of 2 hours. The mixture is stirred for further 12 hours at 0° and then an hour at room temperature. The insoluble urea is removed by filtration and washed thoroughly with water. The aqueous layer and washings are combined and concentrated to about 50 ml. in volume and filtered. The filtrate is added with a small amount of hydrochloric acid and allowed to stand overnight to precipitate 2-(α-(p-chlorophenoxy)-isobutyryl)-aminoethanesulfonic acid as colorless needles of melting point 121°–123°.

EXAMPLE 8

A solution of 1.9 g of p-nitrophenyl α-(p-chlorophenoxy)-isobutyrate (prepared from α-(p-chlorophenoxy)-isobutyric acid and p-nitrophenyl sulfite) in dimethylformamide is added with 1.3 g of finely pulverized 2-aminoethanesulfonic acid. The resulting suspension is heated for 42 hours on a steam bath, cooled to room temperature and filtered. The solvent is distilled off in vacuo and the residue is dissolved in water. The solution is washed with ether and again evaporated in vacuo. The residue is recrystallized from acetone to give 2-(α-(p-chlorophenoxy)-isobutyryl)-aminoethanesulfonic acid, melting at 121.5°–123°.

The following examples are illustrative of the preparation of some representative dosage forms, the compositions of the present invention suitable for therapeutic use.

EXAMPLE A 2-(α-(p-Chlorophenoxy)-isobutyryl)-aminoethanesulfonic acid, 250 parts, is milled and 47 parts of lactose and 3 parts of magnesium stearate are passed through a bolting cloth onto the powder. The combined ingredients are then well admixed for 10 minutes and filled into dry gelatin capsules to produce capsules containing 250 mg of the active ingredient per capsule.

EXAMPLE B

A mixture of 250 g of 2-(α-(p-chlorophenoxy)-isobutyryl)-aminoethanesulfonic acid, 100 g of starch, 44 g of alginic acid and 3g of magnesium stearate, is compressed into slugs which are then broken into granules. The granules are passed a suitable screen and 3 g of magnesium stearate are added. The mixture is then compressed into tablets containing 250 mg of the active ingredient per tablet.

Below are some pharmacological properties of the compound of this invention in comparison with a known compound, ethyl α-(p-chlorophenoxy)-isobutyrate.

1) Toxicity ($LD_{50}$ in Mice)
   2-(α-(p-chlorophenoxy)-isobutyryl)-aminoethanesulfonic acid:
      More than 8 g/kg body weight, orally
   Ethyl α-(p-chlorophenoxy)-isobutyrate:
      1.48 g/kg body weight, orally
2) Effect on Concentration of Cholesterol and Triglyceride in Blood Serum Male Winstar rats weighing approximately 350 grams were divided into five groups comprising each fourteen animals, two test groups, two standard groups and one control group.

Test groups were administered with one or two miligram-equivalents (me) of 2-(α-(p-chlorophenoxy)-isobutyryl)-aminoethanesulfonic acid (I) per kilogram of body weight per day for fourteen consecutive days. Standard groups were administered with one or two miligram-equivalents of ethyl α-(p-chlorophenoxy)-isobutyrate (II), similarly. Control group received no treatment.

24 hours after the final administration, each animal was slightly anesthetized and then the whole blood was removed from thigh artery for analysis.

The cholesterol contents and triglyceride contents in the blood were determined colorimetrically according to the methods described by Zurkowski, P. (Clin. Chem., 10, 451) and by Sardesai, V. M. and Manning, J. A. (Clin. Chem., 14, 156), respectively.

The results are shown in the following Tables 1 and 2.

TABLE 1

Concentrations (mg/ml) of Cholesterol*

| Treatment | Control | I 1me | I 2me | II 1me | II 2me |
|---|---|---|---|---|---|
| | 82 | 92 | 79 | 82 | 93 |
| | 65 | 62 | 57 | 70 | 94 |
| | 74 | 72 | 83 | 76 | 70 |
| | 130 | 70 | 58 | 77 | 70 |
| | 82 | 71 | 58 | 99 | 53 |
| | 65 | 59 | 64 | 59 | 59 |
| Concentrations of Cholesterol (mg/ml) | 77 | 70 | 75 | 94 | 58 |
| | 112 | 89 | 53 | 76 | 80 |
| | 59 | 76 | 87 | 80 | 66 |
| | 94 | 89 | 58 | 53 | 64 |
| | 106 | 63 | 88 | 71 | 76 |
| | 110 | 58 | 70 | 68 | 70 |
| | 95 | 95 | 68 | 65 | 57 |
| | 105 | 84 | 70 | 75 | 76 |
| Average(mg/ml) | 89.7 | 75.0 | 69.1 | 74.6 | 70.4 |
| Percent Reduction | | 16.4 | 23.0 | 16.8 | 21.5 |

TABLE 2

Concentrations (mg/ml) of Triglycerides*

| Treatment | Control | I 1me | I 2me | II 1me | II 2me |
|---|---|---|---|---|---|
| | 70 | 50 | 63 | 73 | 61 |
| | 46 | 46 | 38 | 60 | 52 |
| | 97 | 28 | 29 | 41 | 51 |
| | 45 | 28 | 32 | 30 | 47 |
| | 41 | 31 | 55 | 45 | 66 |
| | 49 | 37 | 41 | 52 | 30 |
| Concentrations of Triglycerides (mg/ml) | 40 | 73 | 43 | 70 | 51 |
| | 97 | 72 | 38 | 43 | 25 |
| | 45 | 23 | 39 | 55 | 11 |
| | 105 | 57 | 64 | 41 | 66 |
| | 82 | 42 | 45 | 37 | 46 |
| | 100 | 48 | 40 | 29 | 28 |
| | 56 | 57 | 30 | 34 | 44 |
| | 67 | 56 | 52 | 49 | 43 |
| Average (mg/ml) | 67.1 | 46.3 | 43.5 | 47.1 | 44.4 |

TABLE 2

| Treatment | Control | I | | II | |
|---|---|---|---|---|---|
| | | 1me | 2me | 1me | 2me |
| Percent Reduction | | 31.0 | 35.2 | 29.8 | 33.8 |

*These tests were performed in winter when the cholesterol reduction minimized.

These results apparently indicate that the present compound significantly reduces the cholesterol concentration and that the effect is approximately equal to or higher than that of ethyl α-(p-chlorophenoxy)-isobutyrate.

3) Effect on Arrhythmia

Male guinea pigs weighing 350 – 400 grams were anesthetized with 1 g/kg (i.p.) of urethane. Bilateral section of the cervical vago-sympathetic trunks was carried out and the peripheral end of the right truck was prepared for electrical stimulation (10 V, 0.5 msec, 5–8 Hz). The test or standard substance was injected intravenously 20 seconds before the onset of vagal stimulation and changes in the heart were recorded by electrocardiograms. That is, by this procedure, the threshold dose of adrenaline to cause arrhythmia was previously established for each animal and the change in the adrenaline threshold after administration of test substance was investigated (cf. Robert, J. and Bear, R., J. Pharmacol., 129, 36).

Sixty and hundred percents depressions were produced by administering with 0.6 and 0.8 miligram-equivalents/kg of 2-(α-(p-chlorophenoxy)-isobutyryl)-aminoethanesulfonic acid (I), respectively. 0.8 Miligram-equivalents/kg of (I) was approximately equal to 20 mg/kg of quinidine sulfate in anti-arrhythmic effects.

Similarly, the duration of the activity was tested. The duration of more than 0.6 miligram-equivalents/kg of (I) proved 4 to 6 hours, while that of 20 mg/kg of quinidine sulfate was 1 to 2 hours.

Meanwhile, such anti-arrhythmic activity was not observed in the test of ethyl α-(p-chlorophenoxy)-isobutyrate.

4) Coronary Dilating Effect

The coronary dilating effects of 2-(α-(p-chlorophenoxy)-isobutyryl)-aminoethanesulfonic acid (I) and ethyl α-(p-chlorophenoxy)-isobutyrate (II) were investigated, using the hearts of male rabbits according to Langendorff's method (Gunn, J. Physiol., 46, 506).

The results are shown in Table 3.

TABLE 3

| Test Substance | Dose | Number of Animals | Average Percent Increase in Coronary Flow |
|---|---|---|---|
| I | 2.5mg (7.3μM) | 5 | 10.4 |
| I | 5.0mg (14.6μM) | 5 | 12.4 |
| II | 7.1mg (29.2μM) | 5 | 0 |

What we claim is:

1. 2-(α-(p-chlorophenoxy)-isobutyryl)-aminoethanesulfonic acid or the salts thereof with pharmaceutically acceptable bases.

2. A compound according to claim 1 in the form of the sodium or potassium salts thereof.

* * * * *